(12) United States Patent
Bhan et al.

(10) Patent No.: US 9,368,137 B2
(45) Date of Patent: Jun. 14, 2016

(54) SELF-CLEANING RECORDING HEADS BASED ON ACTUATOR SEEK PROFILE

(71) Applicant: HGST Netherlands B.V., Amsterdam (NL)

(72) Inventors: Annamica Bhan, San Jose, CA (US); Jorge F. Escobar, San Jose, CA (US); David H. Jen, San Jose, CA (US); Scott McCoy, Pleasanton, CA (US); Thomas Nguyen, San Jose, CA (US); Vedantham Raman, Morgan Hill, CA (US); Kris Schouterden, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/517,584

(22) Filed: Oct. 17, 2014

(65) Prior Publication Data

US 2016/0111114 A1    Apr. 21, 2016

(51) Int. Cl.
*G11B 5/41*    (2006.01)
(52) U.S. Cl.
CPC ........................................ *G11B 5/41* (2013.01)
(58) Field of Classification Search
None
See application file for complete search history.

(56) References Cited

U.S. PATENT DOCUMENTS

| | | | | |
|---|---|---|---|---|
| 4,490,766 A * | 12/1984 | Hill et al. | | 360/137 |
| 4,510,541 A * | 4/1985 | Sasamoto | | 360/97.16 |
| 5,351,156 A * | 9/1994 | Gregory et al. | | 360/69 |
| 5,615,368 A * | 3/1997 | Terashima et al. | | 360/75 |
| 5,850,321 A * | 12/1998 | McNeil et al. | | 360/246.2 |
| 5,863,237 A * | 1/1999 | Felts et al. | | 360/75 |
| 5,889,635 A * | 3/1999 | Sato | | 360/234.1 |
| 6,252,737 B1 * | 6/2001 | Yanagisawa | | 360/75 |
| 6,356,405 B1 | 3/2002 | Gui et al. | | |
| 6,373,651 B1 * | 4/2002 | French et al. | | 360/78.04 |
| 6,493,168 B1 * | 12/2002 | French et al. | | 360/75 |
| 6,687,077 B1 * | 2/2004 | French et al. | | 360/73.03 |
| 6,760,175 B2 * | 7/2004 | Smith | | 360/75 |
| 6,930,849 B2 * | 8/2005 | Tokizono et al. | | 360/75 |
| 7,002,768 B2 * | 2/2006 | Marchon et al. | | 360/75 |
| 7,227,723 B2 | 6/2007 | Nath et al. | | |
| 7,271,976 B2 | 9/2007 | Ishii et al. | | |
| 7,375,917 B1 * | 5/2008 | Fujii et al. | | 360/78.08 |
| 7,561,367 B2 * | 7/2009 | Schreck | | 360/75 |
| 7,826,163 B2 * | 11/2010 | Harmer et al. | | 360/75 |

(Continued)

OTHER PUBLICATIONS

Jon Elerath; Hard Disk Drives: The Good, The Bad and The Ugly; File Systems and Storage; Sep./Oct. 2007; 11 pages; vol. 5 No. 6.

(Continued)

*Primary Examiner* — Wayne Young
*Assistant Examiner* — James L Habermehl
(74) *Attorney, Agent, or Firm* — John D. Henkhaus

(57) ABSTRACT

Cleaning a recording head slider in-drive during operation is accomplished by periodically performing a series of full stroke seek operations, whereby liquid contaminants that may have migrated to the head slider are flung from the slider and liquid from the disk surface may be adsorbed onto the slider for removal by way of flinging. Consequently, head-disk spacing may be stabilized and data write operations improved. Furthermore, the series of full stroke seek operations may be performed at predetermined intervals, and for a predetermined period of time. However, the series may be interrupted by a client request, and continued thereafter, so as not to affect the operational status of the recording system.

17 Claims, 2 Drawing Sheets

(56) References Cited

U.S. PATENT DOCUMENTS

| | | |
|---|---|---|
| 8,203,805 B2 | 6/2012 | Huang et al. |
| 8,405,929 B2 | 3/2013 | Ghaderi et al. |
| 8,553,366 B1 | 10/2013 | Hanke |
| 8,593,763 B2 | 11/2013 | Scheppers et al. |
| 8,780,478 B1 * | 7/2014 | Huynh et al. .................. 360/75 |
| 8,817,413 B1 * | 8/2014 | Knigge et al. .................. 360/75 |
| 8,959,306 B2 * | 2/2015 | Nimura et al. .................. 360/75 |
| 2003/0086200 A1 | 5/2003 | Tokizono et al. |

OTHER PUBLICATIONS

R. Nagarajan; Survey of Cleaning and Cleanliness Measurement in Disk Drive Manufacture; PC; Feb. 1997; pp. 13-14, 16-21; Feb. 1997.

Andrew K. Dickerson et al.; Wet mammals shake at tuned frequencies to dry; Journal of the Royal Society Interface; Aug. 17, 2012; pp. 1-11; The Royal Society; published online Aug. 17, 2012 (received May 25, 2012, accepted Jul. 24, 2012).

\* cited by examiner

SELF-CLEANING RECORDING HEADS BASED ON ACTUATOR SEEK PROFILE

FIELD OF EMBODIMENTS

Embodiments of the invention may relate generally to hard disk drives and more particularly to a technique for cleaning recording heads in operation.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

Modulated or poor writing is one cause of failure with HDDs. There are numerous conditions that can cause poor writing, whereby the written data pattern is so poor in quality that the data is impossible to read back and, consequently, the user can lose data. Thus, consistent quality writing is a fundamental attribute of reliable HDDs.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed toward a technique for cleaning a recording head slider in-situ, or in-drive during operation. By periodically performing a series of full stroke seek (FSS) operations, liquid contaminants that may have migrated to the head slider are flung from the slider. Consequently, head-disk spacing may be stabilized and data write operations improved.

According to embodiments, the series of FSS operations are performed at predetermined intervals, and for a predetermined period of time. However, the series may be interrupted by a client request, and continued thereafter, so as not to affect the operational status of the HDD.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to cleaning a recording head are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Operating Environments

Embodiments may be used in the context of a hard disk drive (HDD), or other data storage device, self-cleaning recording head. Thus, in accordance with an embodiment, a plan view illustrating an HDD 100 is shown in FIG. 1 to illustrate an exemplary operating environment.

Figure 1:
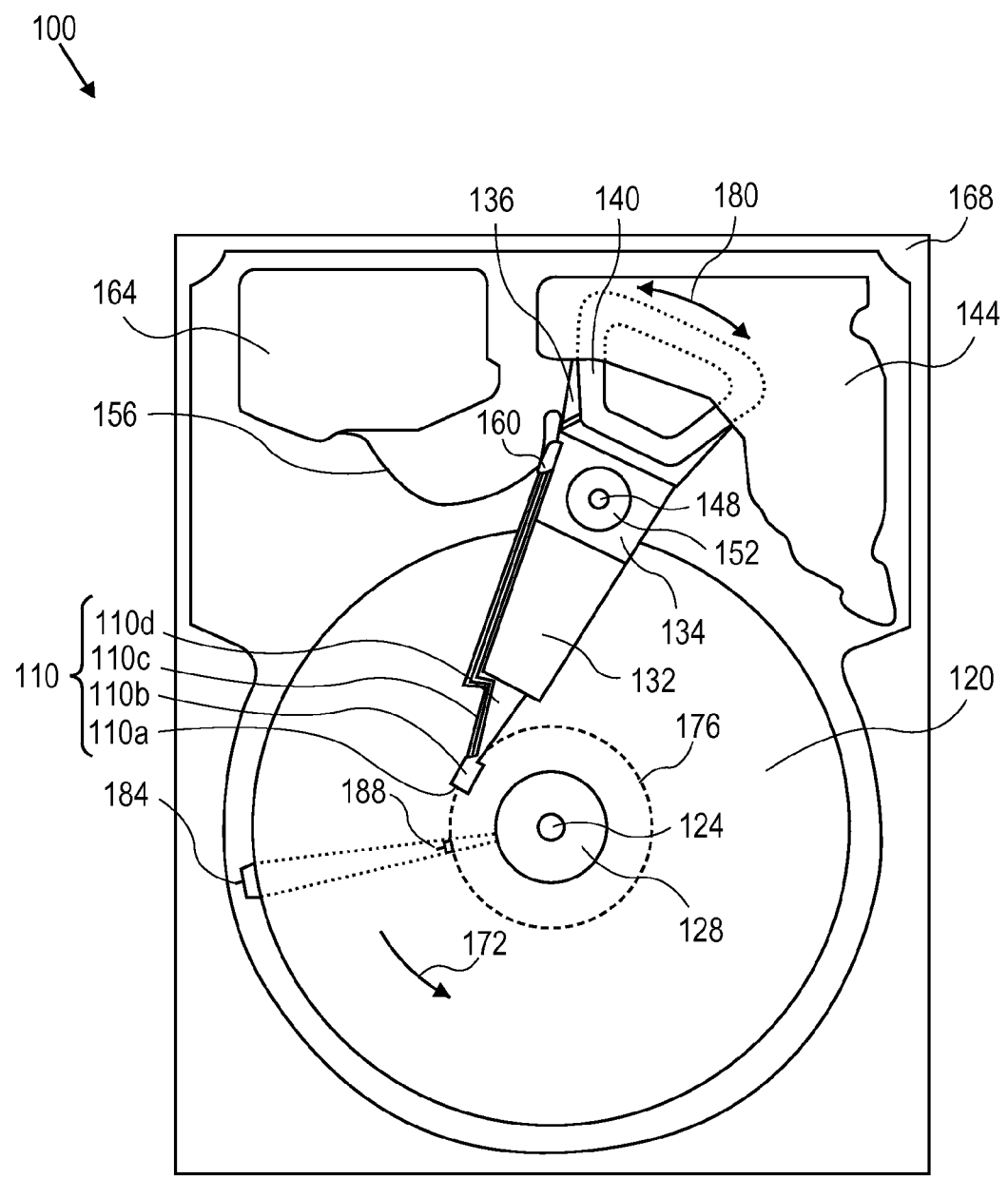
FIG. 1 is a plan view illustrating a hard disk drive, according to an embodiment.

FIG. 1 illustrates the functional arrangement of components of the HDD 100 including a slider 110*b* that includes a magnetic-reading/recording head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one magnetic-recording medium 120 rotatably mounted on a spindle 124 and a drive motor (not visible) attached to the spindle 124 for rotating the medium 120. The head 110*a* includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110, to access portions of the medium 120, being mounted on a pivot-shaft 148 with an interposed pivot-bearing assembly 152. In the case of an HDD having multiple disks, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a base, in conjunction with an HDD cover provides a sealed, protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120.

Information is stored on the medium 120 in a plurality of radially nested tracks arranged in sectors on the medium 120, such as sector 184. Correspondingly, each track is composed of a plurality of sectored track portions (or "track sector"), for example, sectored track portion 188. Each sectored track portion 188 may be composed of recorded data and a header containing a servo-burst-signal pattern, for example, an ABCD-servo-burst-signal pattern, which is information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

As discussed, modulated or poor writing is one cause of failure with HDDs, and there are numerous conditions that can cause poor writing. One mechanism found to cause modulated writing is relatively large accumulations of contaminants, such as oil or other liquid droplets, on failing heads. When a liquid droplet is entrained on a head the head becomes prone to large spacing fluctuations, especially when the liquid bridges the media. If this happens during a writing event, the written data pattern will be so poor in quality that data is typically lost. Non-limiting examples of sources of liquid that may be found to contaminate the head slider include a liquid component of pivot bearing oil, condensation from outgassing of HDD components and aerosols (i.e., air solutions), disk lube pickup, corrosion byproducts, and the like.

Method for Cleaning a Recording Head

Figure 2:
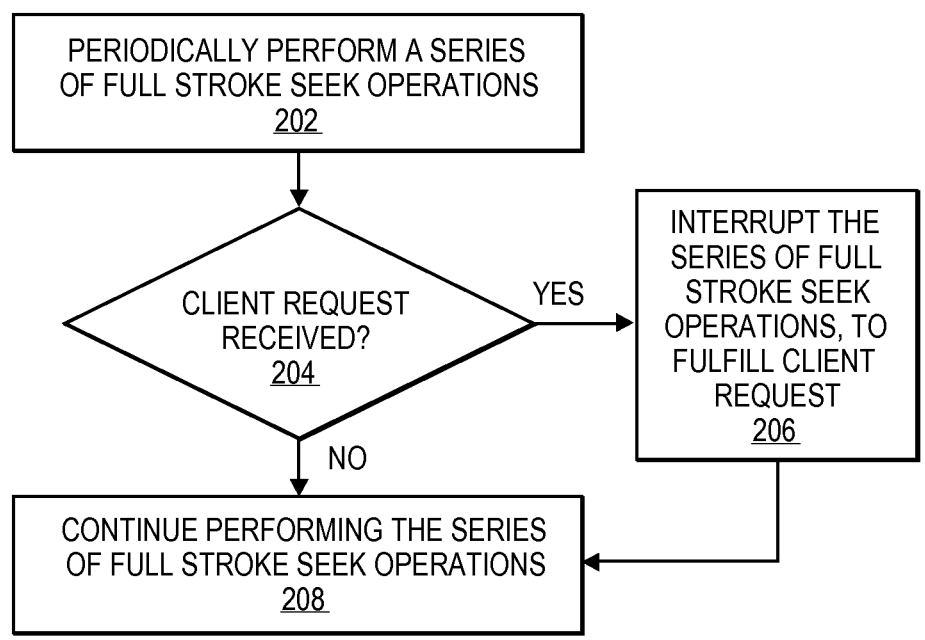
FIG. 2 is a flowchart illustrating a method for cleaning a recording head slider, according to an embodiment.

FIG. 2 is a flowchart illustrating a method for cleaning a recording head slider, according to an embodiment. The process depicted in FIG. 2 may be implemented in an electronic component such as a hard disk controller (HDC), according to an embodiment, or in a system-on-a chip ("SOC"), according to another embodiment. Hard-disk controllers are typically implemented as integrated circuit (IC) boards and, therefore, can be designed in many different architectures of electronic circuitry. Further, modern HDC's often take the form of an SOC. An SOC is an IC that integrates essentially all components of an electronic system into a single chip. An SOC may contain digital, analog, mixed-signal, and other functions, all on a single chip substrate.

The process logic corresponding to the process of FIG. 2 may be implemented as firmware instructions (e.g., executable logic, or program of instructions) stored in memory and executed by a processor, such as a CPU or an MPU, constituent to or outside of the electronic component, or as analog or digital hardware circuitry constituent to the electronic component. The location of the logic corresponding to the method for cleaning a recording head may vary from implementation to implementation and is not limited to implementation within any particular electronic component. Rather, the logic may be implemented in other electronic components constituent to a hard disk drive storage device besides the HDC, as long as the component is effective in commanding, initiating operation of, or driving the voice coil motor/actuator.

At block 202, a series of full stroke seek (FSS) operations is periodically performed. A full stroke seek operation refers to a HDD seek profile in which the voice coil motor operates to move the head slider a full stroke across the surface of the disk, i.e., generally, from a maximum inner diameter (ID) location of the disk to a maximum outer diameter (OD) location of the disk, or vice versa. A series of FSS operations functions to fling or cast any liquid particulate and/or contaminant from the head slider, thereby cleaning the head slider of any such undesirable particulate or contaminant. Furthermore, the series of FSS operations may function to clean the disk surface of liquid droplets, adsorbing liquid from the disk surface such as by way of slider-droplet collision and/or suction, and eventual removal from the head slider by way of flinging. Note that in addition to a series of true full stroke seeks, a series of "long seeks" could be implemented to perform a similar function of flinging liquid contaminants from the head slider, where a "long seek" could be shorter than a FSS but greater than an average seek length that services client requests, where an average seek length is typically optimized/minimized, for example, by command queuing, performance-enhancing algorithms, routines, and the like.

According to an embodiment each seek operation from the series of FSS operations is performed as quickly or as fast as possible within the operational capability of the actuator system, thereby promoting the efficacy of the technique. According to an embodiment the series of FSS operations may be asymmetric in that the ID-to-OD seek operation is performed as quickly as possible within the operational capability of the actuator system while the return OD-to-ID seek operation is performed slower, at less than the maximum operational capability of the actuator system. Such a variation may increase the likelihood that the entrained liquid that is flung from the head slider is flung in the direction toward or away from the disk OD, e.g., outside of the access band (useable area) of the disk and/or to the outer sidewall of the HDD, rather than depositing the entrained liquid toward the disk ID where it is likely to reflux back into the access band region.

For example and according to embodiments, a series of FSS operations is performed for a period of about five (5) seconds about every thirty (30) minutes or so. According to embodiments, to further ensure a clean head slider, a series of FSS operations is also performed for a period of about sixty (60) seconds upon powering up the disk spindle motor, and/or after a prolonged period of the slider being parked on a load/unload (LUL) ramp. Note that the duration and period associated with the head cleaning FSS operations, i.e., the schedule, may vary from implementation to implementation. However, the foregoing embodiments have shown to be effective at removing liquids entrained on the head slider, as well as rendering the disk surfaces effectively cleaned free of liquid droplets.

While some HDDs are configured to perform a full stroke seek at spin-up (i.e., when the spindle motor is powered on), generally as a quick check that all the head stack assemblies are operational, in the field HDDs are often used in a regime in which they are powered up and then left on indefinitely. Thus, these HDDs have a long but light duty cycle in which the HDD is maintained in an idle state for a majority of the time. Therefore, empirical evidence points to the conclusion that the full stroke seek upon spin-up is not sufficient to clean the head slider of contaminants, as does the procedure described in reference to FIG. 2.

According to an embodiment, the cleaning procedure is interruptible. Thus, if a client request (e.g., a data read or write request) is received at block 204, then the series of full stroke seek operations is interrupted at block 206 in response to the one or more client request, in order to fulfill the client request. At block 208, upon completion of the one or more client request, performance of the series of FSS operations is continued. Thus, the performance of the system is not affected by execution of the procedure, which is effectively transparent to the user experience.

Customization and "Intelligence"

There are a number of alternative ways in which the approach to in-situ cleaning of recording heads may be implemented. For example, the technique described in reference to FIG. 2 may be implemented to be customizable, e.g., in the factory and/or by the customer/user. Customer control may be implemented through the use of mode pages, which are used to set operational settings on an HDD via changeable parameters. Thus, if customers want to override execution of the routine for certain of their customers, then the capability to do so is built into the programmed routine.

Additionally, certain "intelligence" may be programmed into the routine embodying the foregoing technique. For a non-limiting example, the type of seek operations that an HDD performs is monitored and the routine is either executed or not executed accordingly. Thus, if the normal HDD usage is identified as including a certain number, duration, or cycle of full stroke seeks, for example, then the routine may be at least temporarily overridden. For another non-limiting example, write operations may be audited with immediate verify operations (after, e.g., every 100th write operation) and if any hint of weakened/light modulated writing is found (e.g., as indicated by soft errors), then the routine may be elevated in priority. For yet another example, if the problem of contaminant migration to the head slider is found to occur primarily only after a certain number of operational hours, then execution of the routine may be deferred until that certain number of operational hours is met.

Extensions and Alternatives

Depending on the configuration of the device in which the foregoing embodiments may be implemented, various alternatives may be available for implementation. For one non-limiting example, if the HDD of interest is configured with a secondary actuation system then the secondary actuation system may be used to augment the foregoing embodiments, such as by performing a full stroke seek with the primary actuator coupled with a full stroke of the secondary actuator. Furthermore, with the relatively high amplitude and frequency that are typically associated with a secondary actuator, one may obtain an ultrasonic cleaning effect by modulating the secondary actuator at maximum or near maximum actuation capabilities, in conjunction with the primary actuator or independent of the primary actuator. For another non-limiting example, if an HDD of interest is configured with a thermal fly-height control (TFC) system then the TFC system may be used to augment the foregoing embodiments, such as by performing a full stroke seek with the primary actuator coupled with a vertical modulation of the slider via the TFC system.

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method of cleaning a recording head slider comprising:
    periodically performing a series of full stroke seek operations as quickly as operationally capable, including performing an inner diameter to outer diameter seek operation as quickly as operationally capable and performing a following outer diameter to inner diameter seek operation at a speed less than what is operationally capable.

2. The method of claim 1, wherein periodically performing includes performing a series of full stroke seek operations for at least about a 5 second duration.

3. The method of claim 1, wherein periodically performing includes performing a series of full stroke seek operations about every 30 minutes.

4. The method of claim 1, further comprising:
    upon powering up a disk spindle motor, performing a series of full stroke seek operations for at least about a 60 second duration.

5. The method of claim 1, wherein periodically performing includes:
    interrupting said series of full stroke seek operations in response to one or more client data operation requests; and
    continuing performing said series of full stroke seek operations upon completion of said one or more client data operation requests.

6. The method of claim 1, wherein periodically performing includes performing a series of full stroke seek operations upon completion of a certain number of operational hours.

7. The method of claim 1, wherein performing said series of full stroke seek operations includes flinging a liquid contaminant from said head slider.

8. The method of claim 1, wherein performing said series of full stroke seek operations includes adsorbing a liquid contaminant onto said head slider from a recording disk surface.

9. The method of claim 1, wherein performing said series of full stroke seek operations consists of performing a series of seek operations that are greater than an average seek length for servicing client requests.

10. A hard disk drive comprising:
    a disk medium rotatably mounted on a spindle;
    a head slider housing a read/write transducer for reading data from and writing data to said disk medium;
    a voice coil motor configured to move said head slider to access portions of said disk medium; and
    an electronic component configured to periodically command said voice coil motor to perform a series of full stroke seek operations as quickly as operationally capable, including performing an inner diameter to outer diameter seek operation as quickly as operationally capable and performing a following outer diameter to inner diameter seek operation at a speed less than what is operationally capable.

11. The hard disk drive of claim 10, wherein periodically commanding includes periodically commanding said voice coil motor to perform a series of full stroke seek operations for at least about a 5 second duration.

12. The hard disk drive of claim 10, wherein periodically commanding includes commanding said voice coil motor about every 30 minutes to perform a series of full stroke seek operations.

13. The hard disk drive of claim 10, said electronic component is further configured to:
    upon powering up a disk spindle motor, commanding said voice coil motor to perform a series of full stroke seek operations for at least about a 60 second duration.

14. The hard disk drive of claim 10, wherein said electronic component is further configured to:
    interrupt said series of full stroke seek operations in response to one or more data operation requests; and
    command said voice coil motor to continue performing said series of full stroke seek operations upon completion of said one or more data operation requests.

15. The hard disk drive of claim 10, wherein periodically commanding includes, upon completion of a certain number of operational hours of said hard disk drive, commanding said voice coil motor to perform a series of full stroke seek operations.

16. A hard disk drive electronic component configured to execute a stored program of instructions to perform method acts comprising:
    periodically commanding performance of a series of full stroke seek operations as quickly as operationally capable to fling a liquid contaminant from a head slider, including commanding performance of an inner diameter to outer diameter seek operation as quickly as operationally capable and commanding performance of a following outer diameter to inner diameter seek operation at a speed less than what is operationally capable.

17. The hard disk drive electronic component of claim 16, configured to execute a stored program of instructions to perform further method acts comprising:
    interrupting said series of full stroke seek operations in response to one or more data operation requests; and
    upon completion of said one or more data operation requests, commanding performance of a remainder of said series of full stroke seek operations.

* * * * *